Patented Aug. 9, 1949

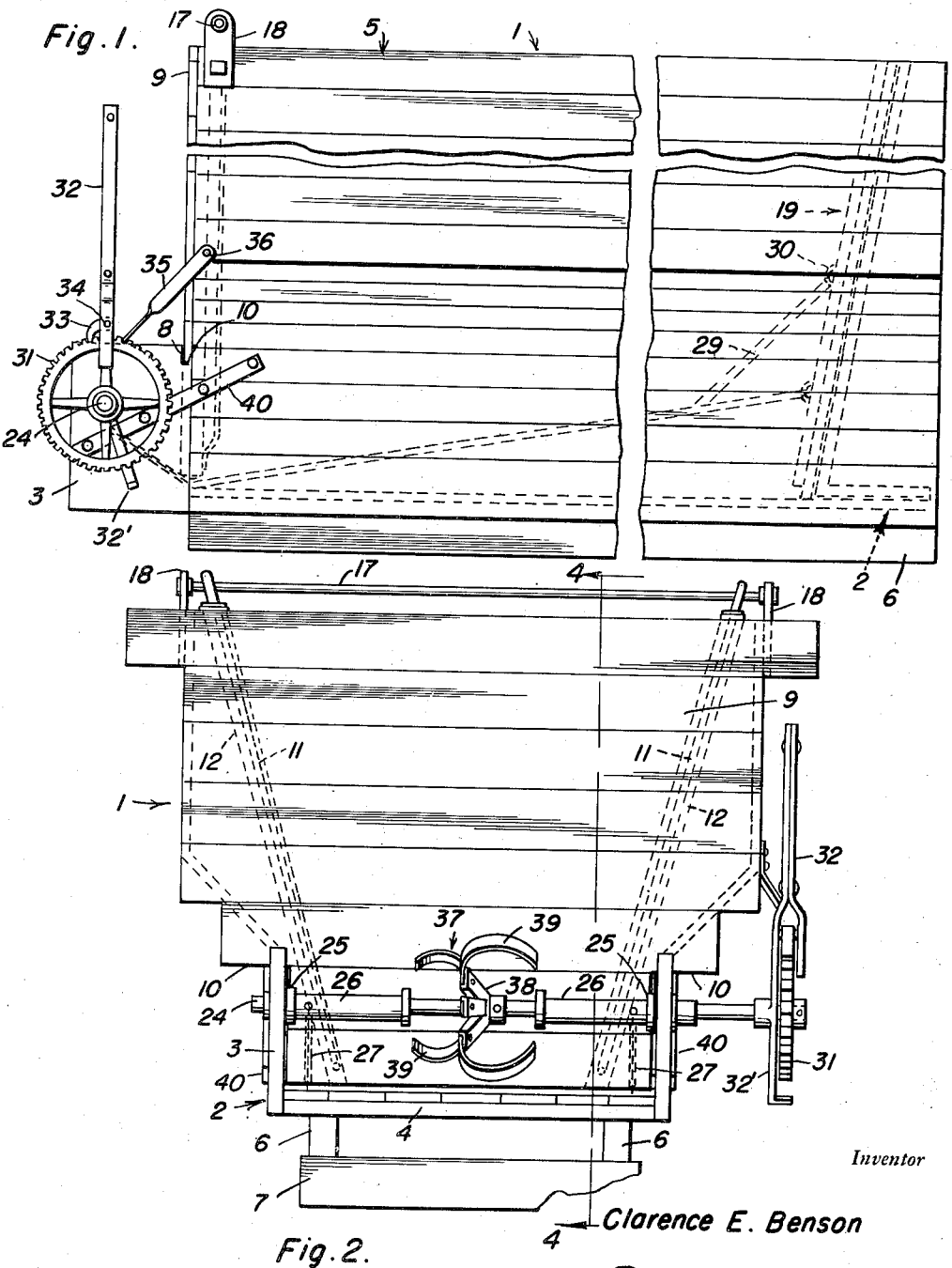

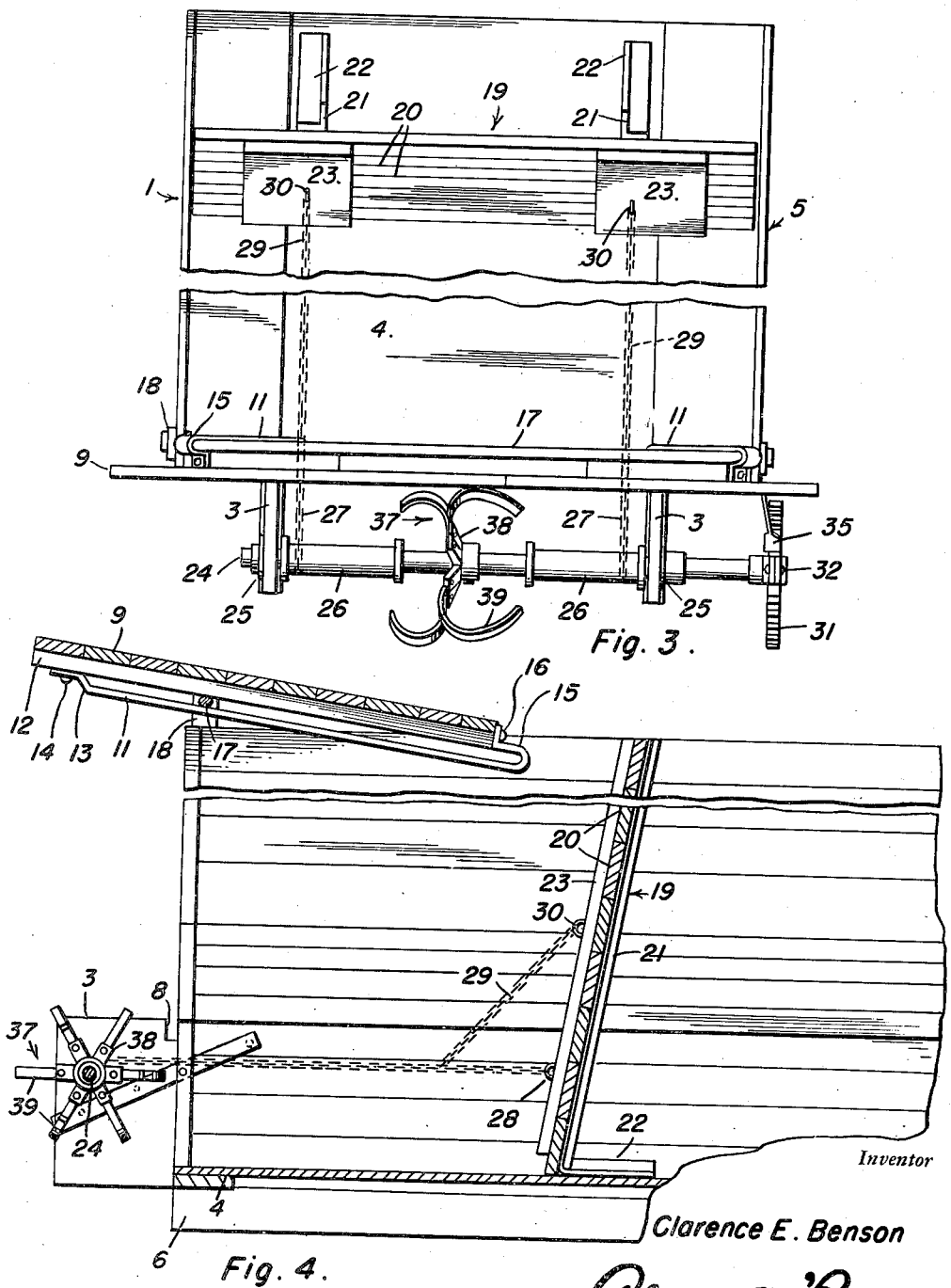

2,478,228

UNITED STATES PATENT OFFICE 2,478,228

UNLOADING MECHANISM FOR WAGON BODIES

Clarence E. Benson, Harris, Iowa

Application December 10, 1947, Serial No. 790,827

3 Claims. (Cl. 214—82)

1

My invention relates to new and useful improvements in unloading mechanism for wagon bodies such as are used on farm wagons especially.

The primary object of the invention is to equip such a wagon body with mechanism of simple form and inexpensive construction manually operative to unload chopped hay, ensilage and the like, from the tail end of the wagon body easily and quickly, to thereby save time and labor.

Another object is to provide unloading equipment for the purpose above set forth which is adapted for attachment to a standard form of wagon body without necessitating material change in the body.

Other and subordinate objects, within the purview of my invention together with the precise nature of my improvements will be readily understood when the succeeding description and claims are read with reference to the drawings accompanying and forming part of the specification.

In said drawings:

Figure 1 is a view in side elevation, partly broken away, of a wagon body equipped with my improved unloading mechanism in a preferred embodiment thereof;

Figure 2 is a view in rear elevation;

Figure 3 is a view in plan partly broken away;

Figure 4 is a fragmentary view in longitudinal section with the tail gate of the wagon body in open position, taken on the line 4—4 of Figure 2.

Referring now to the drawings by numerals, my improved unloading mechanism has been shown therein, for the purpose of illustration, as forming an attachment for a wagon body, designated generally by the numeral 1, and of the hopper type in cross section with a narrow bottom section 2 including sides 3 and a bottom 4, and a relatively wider upper section 5 overhanging the sides 3 of the bottom section 2. The body 1 is supported by the usual side rails 6 and bolsters as at 7, and the tail end thereof is open as usual. The sides 3 of the bottom section 2, according to my invention, are extended rearwardly for a short distance beyond the bottom 4 and are provided with upper edge notches, as at 8, for a purpose presently seen.

A tail gate 9 for closing the rear end of the body 1 is slidable downwardly at its bottom between the sides 3 of the bottom section 2 into closing position with horizontal edge portions 10 fitting into the notches 8 to lock said tail gate to the sides 3 against rearward play, when closed.

2

A pair of guide rods 11 converge upwardly, relatively, from the bottom of the tail gate 9 on the front side thereof, to the upper rear corners of said tail gate in forwardly spaced relation to a pair of similarly arranged cleats 12 on said tail gate 9, said rods having offset lower ends 13 bolted to said cleats 12, as at 14, and upper loop ends 15 bolted to the top edge of the tail gate 9, as at 16, said loop ends being adapted to straddle the usual transverse rod 17 secured in upright bars 18 on the sides of the body 1. As best shown in Figure 4, the arrangement of the guide rods 11 and the cleats 12 is such that the loop ends 15 of said rods 17 are adapted to suspend the tail gate 9, when closed, from the rod 17, and said guide rods 11 and cleats 12 form guideways for the rod 17 whereby the tail gate 9 is slidable upwardly on said rod 17 to lift the edges 10 out of the notches 8 for unlocking said tail gate, after which the tail gate 9 is slidable upwardly and swingable about said rod 17 to dispose said tail gate over the top of the sides of the upper section 5 in open position. The tail gate 9, when closed, is spaced at its bottom edge slightly above the bottom 4 for a purpose presently seen.

An upright ram, or pusher 19, is fitted in the body 1 to extend transversely thereof and is slidable rearwardly on said bottom 4 from the front end of said body to the tail end to expel a load out of said body in a manner presently described. The ram, or pusher, 19 preferably comprises transverse planks 20, of wood, secured in any suitable manner, to a pair of upright bars 21 on the front side of said ram adjacent opposite sides thereof and inclining forwardly and upwardly from the bottom 4 with said planks 20 suitably secured thereto, said bars 21 having acute angled lower ends 22 forming runners adapted to slide on the bottom 4 and supporting said ram, or pusher, 19. A pair of rear, upright reinforcing cleats 23 are provided on said ram, or pusher, 19 adjacent opposite sides thereof and suitably secured to said planks 20 on the rear side of the ram. As will be seen, the ram, or pusher, 19 inclines so that when it is slid rearwardly it acts to scoop up the load from the bottom 4 of the section 2 of the body 1.

Means are provided for pulling the ram, or pusher, 19 rearwardly and now to be described.

A cross shaft 24 is suitably journalled in bearings 25 in the extended sides 3 of the bottom section 2 at a suitable level above said bottom 4 for the discharge of the load under said shaft. A pair of spool type drums 26 are suitably fixed on said shaft 24 adjacent opposite sides 3 between said sides.

A pair of pull chains 27 are secured at one end in any suitable manner to said drums 26 to be wound thereon, said spool chains being extended forwardly under the tail gate 9, when the latter is closed, and into the body 1 with the other ends thereof secured, as at 28, to the cleats 23 adjacent to the bottom edge of the ram, or pusher, 19. The described space provided beneath the bottom edge of the tail gate 9 and the bottom 4, when said tail gate is closed, provides for passing said pull chains 27 under said tail gate 9 when said tail gate is closed.

Branch chains 29 extend upwardly and forwardly from the pull chains 27 and are secured, as at 30, to said cleats 23 to brace said ram, or pusher, 19 under the pull exerted against the same. The drums 26 at the points of connection of the pull chains 27 to said cleats 23 are above the bottom edge of the tail gate 9, when said tail gate is closed, so that initial pull by said pull chains tends to lift the tail gate 9 and lift the edges 10 out of the notches 8 to unlock said tail gate.

A toothed wheel 31 is fixed on one end of the shaft 24 outside the bottom section 2 for operation by a pawl carrying hand lever 32 rotatably mounted on said end of the shaft 24 alongside said wheel 31 to be swung downwardly and rearwardly to operate said wheel.

A gravity pawl 33 pivoted on the hand lever 32, as at 34, engages said wheel 31 during downward and rearward swinging of said hand lever 32 from an upright position to a position in which said lever nears the ground, at which point said pawl 33 falls and is disengaged from said wheel 31.

A gravity holding dog 35 for the toothed wheel 31 is pivoted at one end, as at 36, on the body 1 with its other end dogging and overlying said wheel 31 to hold the same against reverse rotation. The hand lever 32 is provided with an extension 32' adapted, when said lever is swung as described, substantially to the ground, to engage said dog 35 and lift the same out of dogging position.

A beater 37 is provided on the shaft 24 for separating and scattering the chopped hay, or ensilage material being unloaded and thereby facilitating unloading the same. The beater 37 comprises a spider 38 fast on said shaft 24 in the transverse center thereof with two sets of resilient bar-like blades 39 thereon. The blades 39 in each set are curved longitudinally of the shaft 24 and oppositely in each set, relative to those in the other set, as best shown in Figures 2 and 3, and said blades alternate in each set relative to the blades in the other set.

Suitable strap iron bars 40 brace the extended sides 3 of the bottom section 2 at the rear of the body 1.

Referring now to the operation of the invention, with the ram, or pusher, 19, at the front end of the body 1 and said body loaded with chopped hay, ensilage, or the like, not shown, the unloading operation is effected as follows. The hand lever 32 is first swung from vertical position downwardly and rearwardly sufficiently to cause the pull chains 27 to tighten and lift the tail gate 9 to unlocked position in the manner described, after which said tail gate 9 may be slid and swung, as described, onto the top of the body 1 into its fully open position as shown in Figure 3. The hand lever 32 is then swung toward ground, as described, and returned to upright position alternately, thus causing the toothed wheel 31 to be rotated intermittently. This causes the drums 26 to wind up the pull chains 27 intermittently and pull the ram, or pusher, 19 rearwardly in the body 1, step by step, so that said ram, or pusher pushes the load out of the tail end of the body 1, a portion at a time. As each portion is pushed out, the spider 37 is rotated to separate and scatter the hay, or ensilage, so that the same will not clog in between the sides 3 of the body section 2 at the tail end of said body. This facilitates the unloading operation as will be clear. Each time the hand lever 32 is returned to upright position, the holding dog 35 holds the toothed wheel 31 against the pull of the tight pull chains 27 to prevent unwinding of the same.

When the unloading is finished, the hand lever 32 may be swung to ground, or further than previously, to engage the extension 37 with the holding dog 35 and to swing said dog to disengaged idle position. Then, the ram, or pusher, 19 may be shoved back to the front end of the body 1 with the toothed wheel 31 and the shaft 24 and drums 26 idling to permit unwinding of the pull chains 27 from said drums 26. The manner in which the tail gate 9 may be closed and locked will be clear without further description.

As will be clear, the described unloading mechanism is especially adapted for unloading chopped hay, or ensilage, into a conventional blower, not shown, for blowing the unloaded material into a silo or the like.

The foregoing will, it is believed, suffice to impart a clear understanding of my invention.

Manifestly, the invention, as described, is susceptible of modification without departing from the inventive concept and right is herein reserved to such modifications as fall within the scope of the appended claims.

Having described the invention, what is claimed as new is:

1. The combination with a wagon body having an open tail end, and a bottom, of an upright ram fitted in said body to extend transversely thereof and slidable from the front to the tail end of said body on said bottom to push a load of divided material out of said tail end, means at said tail end of the body manually operative to slide said ram toward said tail end step by step to push portions of the load out of said end successively, and a tail gate for said body normally locked in closed position and slidable vertically to unlock the same by initial operation of said means.

2. The combination with a wagon body having on open tail end, and a bottom, of an upright ram fitted in said body to extend transversely thereof and slidable from the front to the tail end of said body on said bottom to push a load of divided material out of said tail end, and means at said tail end of the body manually operative to slide said ram toward said tail end step by step to push portions of the load out of said end successively comprising a pair of pull chains attached to said ram adjacent opposite side edges thereof, and a pair of wind-up drums for said chains at the tail end of said body and opposite sides thereof, and a vertically slidable tail gate for said tail end with which said chains are slidably engaged to slide the same upwardly into partly open position upon initial operation of said means.

3. The combination with a wagon body having an open tail end, and a bottom, of an upright ram fitted in said body to extend transversely thereof and slidable from the front to the tail end of said body on said bottom to push a load of divided material out of said tail end, means at said tail end of the body manually operative to slide said ram toward said tail end step by step to push portions of the load out of said end successively comprising a rotary shaft, and a beater fast on said shaft for scattering the material in said portions comprising sets of rotary bar-like blades grouped around said shaft in spaced relation thereto, said blades being longitudinally curved and extending lengthwise oppositely in the sets relatively toward opposite ends of said shaft.

CLARENCE E. BENSON.

REFERENCES CITED

The following references are of record in the file of this patent:

UNITED STATES PATENTS

| Number | Name | Date |
|---|---|---|
| 773,332 | Merrell | Oct. 25, 1904 |
| 835,641 | Sams | Nov. 13, 1906 |
| 879,437 | Bloom | Feb. 18, 1908 |
| 1,963,478 | Swanson et al. | June 19, 1934 |
| 2,221,266 | Roach | Nov. 12, 1940 |